May 14, 1940.  W. FASS  2,200,837
ROLLING MILL
Filed Aug. 9, 1938  2 Sheets-Sheet 1
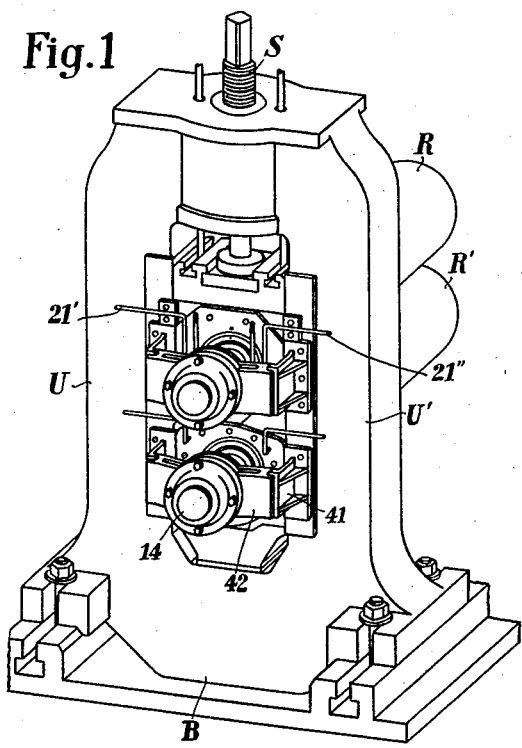
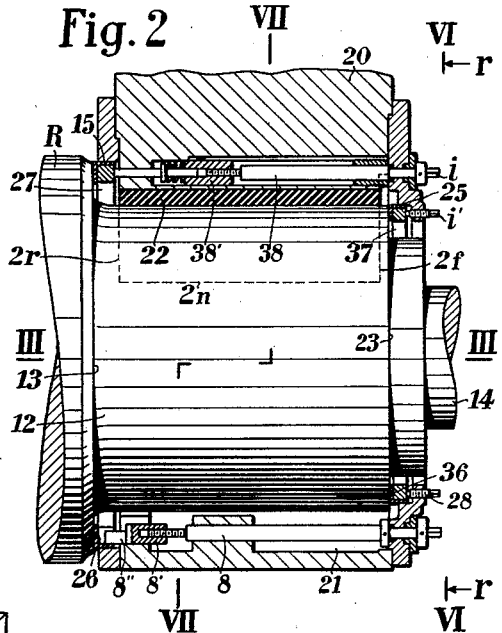
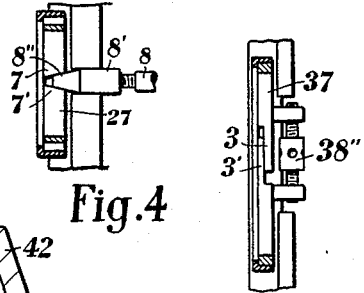
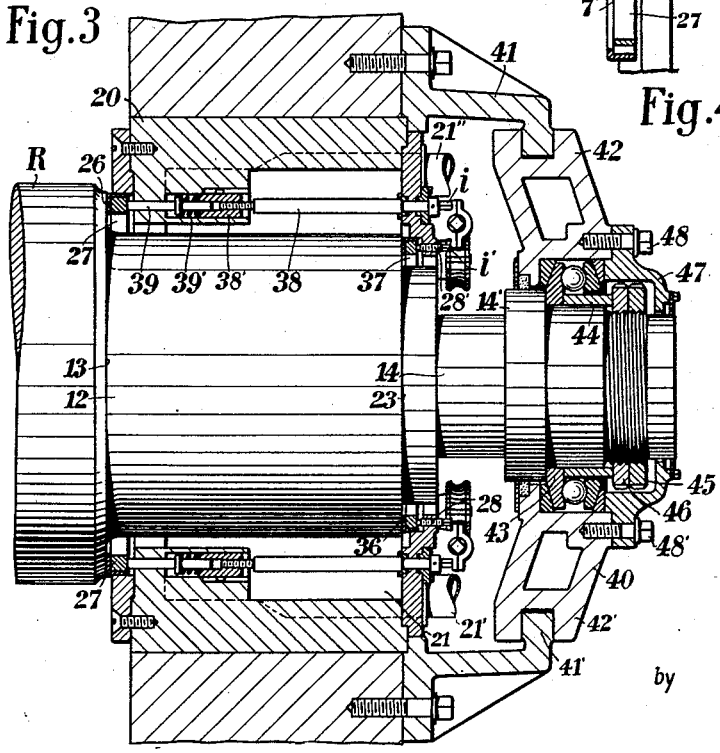
INVENTOR
Wilhelm Fass
by Karl Viertel
Attorney May 14, 1940.  W. FASS  2,200,837
ROLLING MILL
Filed Aug. 9, 1938  2 Sheets-Sheet 2
Fig. 6
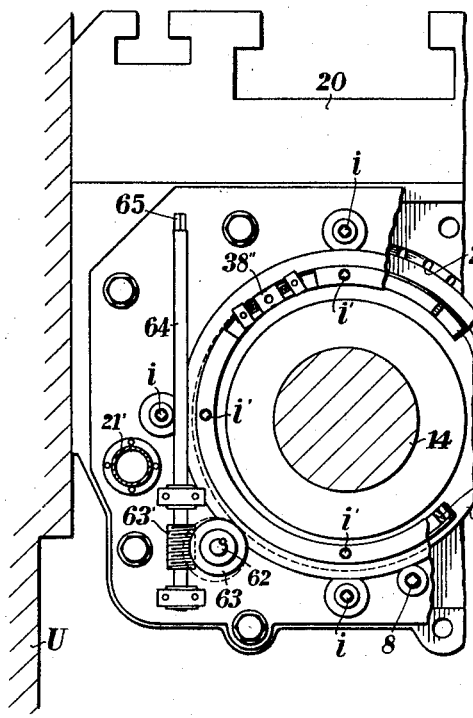
Fig. 7
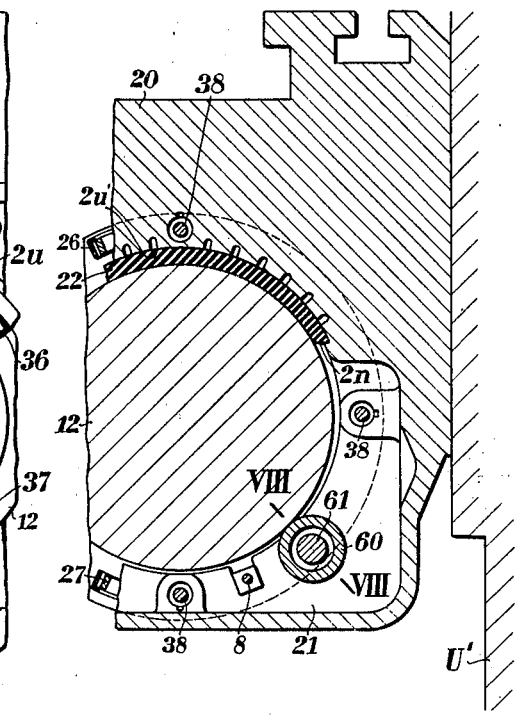
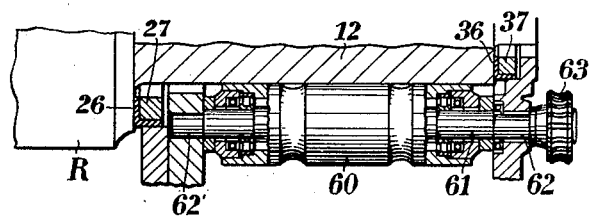
Fig. 8
INVENTOR
Wilhelm Fass
by Karl Viertel
Attorney Patented May 14, 1940

2,200,837

UNITED STATES PATENT OFFICE 2,200,837

ROLLING MILL

Wilhelm Fass, Magdeburg, Germany, assignor to Fried-Krupp, Grusonwerk, Aktiengesellschaft, Magdeburg, Buckau, Germany Application August 9, 1938, Serial No. 223,871
In Germany August 14, 1937

7 Claims. (Cl. 80—55)

My invention relates to the problem of effectively cooling and lubricating the bearings and necks of rolling mill rolls and like bearings specially designed for heavy loads and high duty work.

In various types of rolling mills and especially hot-roughing mills, in which the rolls are subjected to the great heat of the ingots etc. under treatment and to severe shocks produced by the entrance into and discharge from the mill of the work pieces, bearings of the friction type have been found more satisfactory than roller type bearings; their cooling and lubrication however as accomplished heretofore and according to the present state of the art, leaves much to be desired.

More especially in view of the difficulties which accompany the supervision of the roll neck bearings, their re-adjustment, the replacement of worn parts and like operations, and because of the drawbacks which are encountered in coping with the rapid wear of the bearing surfaces, compensating undue play therebetween and at the same time in keeping effectively sealed the bearings and the cooling chambers provided therein against leakage, namely egress of cooling agent and intrusion of foreign matter such as mill scale, dust, cinders, etc.

An outstanding feature of the invention consists in the provision of a journal bearing having an arc shaped bearing plate and a cooling chamber, wherein relatively large portions of the roll neck and the bearing plate are directly exposed to a cooling agent circulated therethrough,— the ultimate objects being to safeguard the roll neck and its bearing plate against overheating in the course of heavy duty work, and the accidental intrusion of foreign matter into the bearing, and to afford the use of bearing plates, which can be made of non-metallic compounds available even in critical periods yet requiring enforced cooling; see for instance "Machinery's Encyclopedia," published 1917 by "The Industrial Press," New York, volume I, page 299, last paragraph: "Apparently, many bearing metals are unnecessarily expensive, containing higher percentages of high-priced metals than is required, a fact borne out by the experiences of German machine builders during the great European war, when cheaper substitutes had to be used."

The invention aims more especially at providing roll neck bearings having improved sealing means for safely retaining the cooling agent therein, so designed and yieldingly associated with the roll necks and the cooling chambers in the bearing blocks that their sealing action can be relied upon and will be maintained under changing and adverse working conditions, namely independently of radial and axial displacements of the roll necks and their bearings relatively to each other as the result of wear of the bearing surfaces and of end thrust.

Another object of the invention is to so redesign the roll bearings concerned, that their sealing means are readily accessible for supervision, and that undue interruptions in the working of the mill caused heretofore by re-adjusting and tightening operations, are avoided.

Still other objects of the invention will become incidentally apparent to practitioners in this field as the description proceeds.

The nature and scope of this invention are briefly outlined in the appended claims and will be more fully understood from the following specification taken together with the accompanying drawings in which Fig. 1 is a fragmentary end view of a two-high rolling mill redesigned according to this invention and perspectively shown by way of an example, Fig. 2 is a fragmentary section vertically taken on the median plane of symmetry through the neck bearing of the upper roll of the mill shown in Fig. 1, Fig. 3 is a fragmentary section horizontally taken through the same neck bearing on line III—III in Fig. 2, Figs. 4 and 5 are fragmentary plans partly in section, showing devices for re-tightening the sealing members, Fig. 6 is a fragmentary front elevation partly in section on line VI—VI in Fig. 2 and seen in the direction of the arrows r—r, Fig. 7 is a fragmentary section vertically taken on line VII—VII in Fig. 2, Fig. 8 is a cross section on line VIII—VIII in Fig. 7 through one of the neck supporting rolls.

Briefly stated, one of the most important features of the invention is the provision of structurally improved main or journal bearings 20 (Figs. 2 and 3) for the roll necks proper 12, hereinafter called "primary" necks, and of separate thrust bearings 40, spaced from the former and being self-adjusting vertically, for engagement with auxiliary roll necks 14 specially provided and hereafter called "secondary" necks.

Other equally important features of the invention consist in that cooling chambers of improved design are provided in said journal bearings for effectively cooling the primary roll necks and their bearing members by means of a cooling agent circulating through that chamber, and sealing members adapted to prevent leakage and the intrusion of foreign matter into the bearing such as mill scale, dust, cinders, etc., produced during the operation of the mill; said thrust bearings are axially adjustable and adapted to relieve said sealing members from undue axial pressure known as "end thrust" and to prevent excessive and premature wear.

Still another noteworthy feature of the invention is the provision of improved means for re-adjusting and re-tightening said sealing members. By virtue of the specific design and arrangement of said thrust bearings the said means for re-adjusting and re-tightening the sealing members are always readily accessible to the operator of the mill from without, namely in the space provided between the journal bearings and the thrust bearings cooperating therewith.

Moreover the thrust bearings because of being vertically self-adjusting and independent of the main bearings are not affected in their proper working by wear and accidental displacements of the bearing surfaces relatively to each other occurring in the main bearings.

The rolling mill shown in Fig. 1 and embodying this invention is of the so-called two-high type comprising a mill housing of conventional design having a base B, two standards U, U' and the usual window for the reception of the bearing construction for the work rolls R, R'; according to this invention the work rolls are formed with stepped ends namely presenting primary necks 12 referred to above, adjacent to the roll barrels, and secondary necks 14 formed with collar 14'.

The bearing construction for the upper work roll R, which is described hereinafter in detail, comprises:

(1) A journal bearing block 20 telescopingly receiving the primary neck 12 and being adjustably mounted in the mill housing namely cooperatively associated with a conventional adjusting screw S threaded in the latter; a chamber 21 is formed in said bearing block through which a liquid cooling and lubricating agent is circulated by means of pipe connections, indicated at 21', 21'' in Fig. 1, and a pump (not shown).

(2) A bearing plate 22 (Figs. 2, 7) so designed and fixed in the bearing block 20 as to be most effectively cooled, namely by exposing in addition to a great many sections of its upper face 2u, 2u', its frontal edge 2f, rear edge 2r, and its lower lateral edges 2n to the cooling agent.

Good results have been obtained by this cooling expedient in the course of the inventor's experimental work with water as cooling agent and with bearing plates 22 made even of non-metallic bearing compounds which are nowadays made and known in Germany as serviceable substitutes for bronze and brass.

(3) Sealing means for retaining the cooling agent in said chamber 21 and keeping out mill scale, cinders, etc. scattered about during the rolling operations; said sealing means comprise: Flat (primary) packing faces 13 and 23 formed at the stepped ends of the roll barrel R and of the primary roll neck 12, secondary cylindrical packing faces 15, 25 formed in the bearing block 20 adjacent to the primary ones and at right angles thereto, annular gaskets 26, 36 of angular cross-sectional shape interengaging said packing faces 13, 23, 15, 25, split packing rings 27, 37 engaging said gaskets from within, and means accessible from without, for re-adjusting and re-tightening said packing rings in axial direction and circumferentially.

Said means for re-adjusting said packing rings 27, 37 in axial direction comprise: Two sets of screw and nut gears, an inner set 28, 28' and an outer one 38, 38' arranged concentrically to each other in said bearing block 20 for engagement with said packing rings 27, 37 and with their square shaped operating heads i, i' outwardly projecting from the bearing block 20 so as to be readily accessible to the operator; pressure bolts 39 loaded by springs 39' interengage resiliently the outer set of said screw and nut gears 38, 38' and the packing ring 27. Said means for circumferentially expanding and re-tightening said packing rings 27, 37 comprise:

A screw and nut gear 8, 8' diagrammatically shown in Fig. 4 and having a conical end portion 8'' interengaging the opposed conical ends 7, 7' of the split packing ring 27, and a right and left hand screw coupling 38'' (Figs. 5 and 6) threaded in and interengaging the overlapping ends 3, 3' of the other split packing ring 37.

(4) Adjusting means for keeping the primary neck 12 of the upper work roll R in engagement with its bearing plate 22 so as to compensate wear of the latter and avoid undue play therebetween; said adjusting means comprise two neck supporting rolls 60 which are rotatably mounted—according to this invention—also within the cooling chamber 21 on revolvable shafts 61 having eccentric necks 62, 62'; said necks are journalled in the bearing block 20 and are cooperatively associated with worm gears 63, 63', having spindles 64 which terminate in square heads 65 for operating said worm gears and in turn revolving said eccentric necks 62, 62'.

Except for the omission of said adjustable supporting rolls 60, (Figs. 6—8) which are dispensable as the primary neck of the lower work roll R' is gravitationally held against its bearing plate underneath, the journal bearing for the lower work R' is conform in its design to that of the upper work roll R described above.

(5) Thrust bearings 40 of the roller type engaging said secondary roll necks 14, 15 of the work rolls R, R' and being slidably attached by means of interengaging guide members 41, 41', 42, 42' to the mill housing U, U' in spaced relation thereto so as to be self-adjusting in vertical direction and independent of the journal bearings 20.

Means are provided for adjusting the relevant bearing parts of said thrust bearings 40 in horizontal or axial direction namely relatively to said gaskets 27, 37 so as to effectively take up accidental end thrust occurring in the work rolls R, R' and thus to relieve said gaskets 26, 36 and their packing rings 27, 37 from undue axial pressure and to prevent excessive and premature wear.

Said adjusting means comprise a bearing ring 43 engaging collar 14' of the secondary roll neck and being exchangeably mounted thereon, a sleeve 44 engaging said bearing ring 43 and a pair of nuts 45, 46 threaded on the secondary neck 14 for keeping said sleeve and ring in their place; by detaching a cover 47 fixed to the casing 40 by bolts 48, 48', the inner parts of the thrust bearing are accessible for supervision, repair, re-adjustment and kindred operations.

Because of the ample space provided between said thrust bearings 40 and the respective journal bearings 20 the various re-adjusting devices for re-tightening the sealing members in the cooling chamber 21 described above are readily accessible for supervision and attendance; likewise the worm gears 63, 63', 64, 65 for controlling the bearing contact of the primary neck 12 of the upper work roll R and its bearing plate 22 are accessible without any dismantling or disassembling operations being required.

Various changes and modifications may be conveniently made in the structural details, assemblage and cooperation of the component parts of bearing constructions of the improved design for rolling mills and other high duty work described hereinbefore, without substantially departing from the spirit and the salient ideas of this invention.

What I claim is:

1. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing, in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, and means in said cooling chamber and projecting into the space between said journal and thrust bearings for retightening said sealing means.

2. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing, in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, and means in said cooling chamber and projecting into the space between said journal and thrust bearings for retightening said sealing means, said sealing means comprising flat primary packing faces, formed at the ends of the roll barrel and of said primary roll neck, and secondary cylindrical packing faces formed in said journal bearing adjacent to the primary ones and at right angles thereto, and packing means interengaging the respective packing faces.

3. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing, in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, and means in said cooling chamber and projecting into the space between said journal and thrust bearings for retightening said sealing means, said sealing means comprising flat primary packing faces, formed at the ends of the roll barrel and of said primary roll neck, and secondary cylindrical packing faces formed in said journal bearing adjacent to the primary ones and at right angles thereto, and packing means interengaging the respective packing faces—said packing means comprising annular gaskets of angular cross-sectional shape, split packing rings engaging said gaskets from within, and means for readjusting and expanding said packing rings in axial direction and circumferentially.

4. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, and means in said cooling chamber and projecting into the space between said journal and thrust bearings for retightening said sealing means, said sealing means comprising flat primary packing faces, formed at the ends of the roll barrel and of said primary roll neck, and secondary cylindrical packing faces formed in said journal bearing adjacent to the primary ones and at right angles thereto, and packing means interengaging the respective packing faces,—said packing means comprising annular gaskets of angular cross-sectional shape split, packing rings engaging said gaskets from within, and means for readjusting and expanding said packing rings in axial direction and circumferentially,—said means for readjusting said packing rings in axial direction comprising two sets of screw and nut gears, namely an inner set and an outer one concentrically arranged in said journal bearing for engagement with said packing rings and having operating heads projecting into the space between the said journal and thrust bearings.

5. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, and means in said cooling chamber and projecting into the space between said journal and thrust bearings for retightening said sealing means,—said sealing means comprising flat primary packing faces, formed at the ends of the roll barrel and of said primary roll neck, secondary cylindrical packing faces formed in said journal bearing adjacent to the primary ones and at right angles thereto, and packing means interengaging the respective packing faces,—said packing means comprising annular gaskets of angular cross-sectional shape, split packing rings engaging said gaskets from within, and means for readjusting and expanding said packing rings in axial direction and circumferentially,—said means for circumferentially expanding said packing rings comprising a screw and nut gear having a conical end portion and interengaging the opposed conical ends of the split packing ring in contact with the stepped end of the roll barrel, and a right and left hand screw coupling interengaging the overlapping ends of the other split packing ring in contact with the primary roll neck.

6. In a rolling mill, a mill housing, a work roll arranged in said housing and having a primary roll neck adjacent to the roll barrel and terminating in a secondary neck, a journal bearing adjustably mounted in said mill housing, and having an arc shaped bearing plate engaging the upper face of said primary roll neck, a thrust bearing engaging said secondary roll neck and being slidably attached to the mill housing, in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, means in said cooling chamber and projecting into the space between said journal and thrust bearings for retightening said sealing means, and means in said cooling chamber and projecting into the space between said journal and thrust bearings for re-adjusting the primary roll neck relatively to its bearing plate so as to compensate for wear.

7. In a rolling mill, a mill housing, a work roll arranged in said housing and having a primary roll neck, a journal bearing adjustably mounted in said mill housing, and having an arc shaped bearing plate engaging the upper face of said primary roll neck, a thrust bearing engaging said secondary roll neck and being slidably attached to the mill housing, in spaced relation to said journal bearing so as to be self-aligning, a cooling chamber formed in said journal bearing, wherein the lower face of the primary roll neck and the frontal, rear and lateral edges of its bearing plate are directly exposed to a cooling agent circulated therethrough, sealing means in said journal bearing for retaining the cooling agent therein, means in said cooling chamber and projecting into the space between said journal and thrust bearings for retightening said sealing means, and means in said cooling chamber and projecting into the space between said journal and thrust bearings for re-adjusting the primary roll neck relatively to its bearing plate so as to compensate for wear, said readjusting means comprising neck supporting rolls eccentrically journalled within said cooling chamber and worm gears accessible from without for revolving their journals.

WILHELM FASS.